United States Patent [19]

Matyschik et al.

[11] 4,026,398
[45] May 31, 1977

[54] CLUTCH RELEASE BEARING

[75] Inventors: Otto Matyschik, Nudlingen; Leo Kühnlein, Schweinfurt, both of Germany

[73] Assignee: SKF Industrial Trading and Development Company, B.V., Nieuwegein, Netherlands

[22] Filed: May 20, 1975

[21] Appl. No.: 579,265

[30] Foreign Application Priority Data
June 1, 1974 Germany .................. 7419066[U]

[52] U.S. Cl. .................. 192/98; 308/233
[51] Int. Cl.² .................. F16D 23/14
[58] Field of Search .................. 308/189, 233, 235; 192/98, 110 B

[56] References Cited
UNITED STATES PATENTS

| | | | |
|---|---|---|---|
| 3,788,437 | 1/1974 | Camp | 192/98 |
| 3,920,107 | 11/1975 | Limbacher | 308/233 |

*Primary Examiner*—Joseph F. Peters, Jr.
*Assistant Examiner*—Richard A. Bertsch
*Attorney, Agent, or Firm*—Daniel M. Rosen

[57] ABSTRACT

A clutch release bearing assembled with a holding ring axially fixed on a sliding sleeve, and with the outer race of the bearing encircling the sleeve; recesses in the outer race engage projections in the holding ring, thereby allowing the outer ring to have relative radial movement without relative rotational movement with respect to the sleeve, and thus permitting self-centering of the bearing on the sleeve.

13 Claims, 5 Drawing Figures

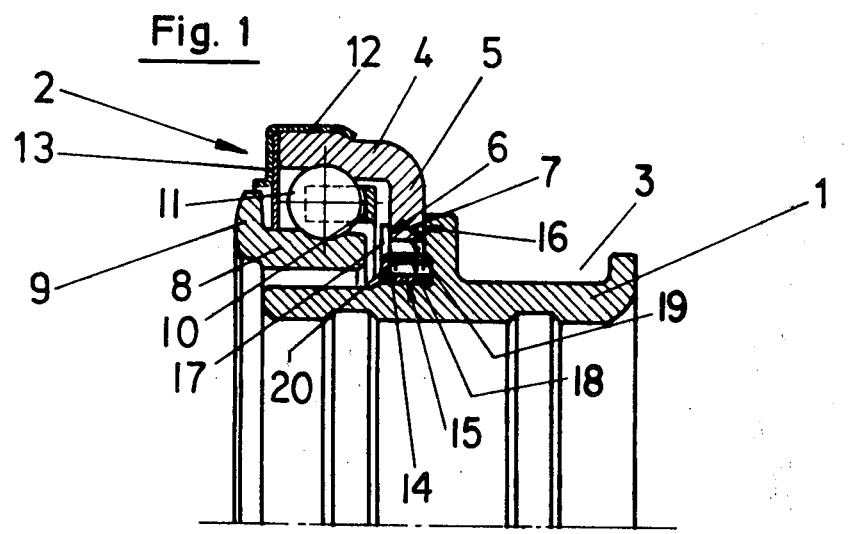
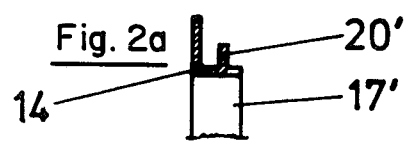
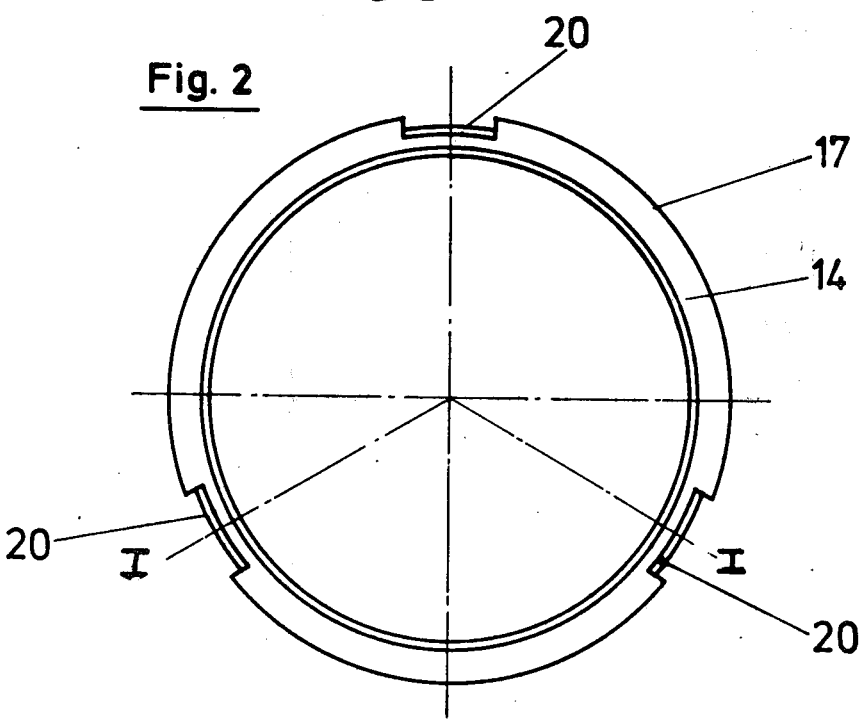

4,026,398

CLUTCH RELEASE BEARING

BACKGROUND OF THE INVENTION

The invention relates to a clutch release bearing, in particular for motor vehicles, with a bearing arranged on a sliding sleeve; the outer race of the bearing is provided with a flange directed toward the center of the bearing and arranged, by means of a preferably angle-shaped supporting ring situated on the sliding sleeve, to be radially displaceable on said sleeve.

A clutch release of this type has become known in the art through the German Utility Model Pat. No. 7,326,552. To permit radial adjustability of the bearing, a holding element for the release bearing is arranged in that case between the flange portion of the outer ring and the sliding sleeve. A twisting of the stationary bearing race can not be prevented in all instances in the case of this design.

It is therefore the object of the invention to create a clutch release bearing that will permit radial adjustment movements of the bearing and in which the adjustable bearing is to be rendered secure against twisting with respect to the sliding sleeve. In addition, the design is to be simple and is not to involve excessive manufacturing cost, thereby permitting efficient and economic manufacture.

SUMMARY OF THE INVENTION

In accordance with the invention the above-described object is achieved with a clutch release bearing wherein there are provided projections or the like circumferentially distributed around the holding ring, that are to secure the bearing against twisting, said projections engaging corresponding recesses arranged in the flange of the outer race oriented toward the center of the bearing. In this arrangement the projections on the holding ring can be oriented in axial or in radial direction.

In a clutch release bearing designed in this manner, a radial adjustment movement for self-centering is made possible. Moreover, in accordance with the invention, the stationary outer race is circumferentially mounted to be twist-resistant, as a result of projections or the like, so that wear-free operations can be achieved during the self-centering movements; also the bearing operates at a reduced noise level in any operating state.

For the purpose of a simple design and economic manufacture of the clutch release bearing in accordance with the invention, it is advantageous if the mounting ring is made of a thin-walled material, preferably thin-walled sheet metal, and if the projections are designed to constitute one piece with one of the legs of the holding ring. It is furthermore economically advantageous if the projections made out of one piece at the holding ring are bent over as flanges or the like. In view of the fact that, for supporting and for securing against twisting of the stationary bearing race, only one component has been provided for, this advantageous embodiment offers great benefits in manufacture as well as in the maintenance of the bearing. Also as a result of this arrangement, the assembly of the release clutch is improved considerably.

As a further development of the invention, the holding ring can be made of an elastic material, for instance plastic or the like, and be designed to be manufactured in one piece with projections. This is advantageous in particular if the elastic component in accordance with the invention is used for muting and, therefore, for achieving a low-noise operating state. An additional characteristic of the invention provides an improved hermetic sealing of the bearing if the elastic holding ring provided with projections is designed to be integral with a substantially axially oriented sealing lip contacting the face of the rotating bearing race in an axially sealing manner. In this design, the holding ring made of elastic material performs a plurality of duties. On the one hand, the holding ring permits self-centering, that is to say, the bearing is arranged to be radially displaceable on a sliding sleeve; on the other hand, the projections integrally connected therewith and which engage corresponding recesses in the flange of the stationary bearing race are used to prevent the radial distortion and, moreover, the radial leg of the holding ring maintains the stationary bearing race in axial direction. Finally, as a result of the sealing lip integrally connected with the holding ring, the inner chamber of the bearing is thus unilaterally sealed, thereby preventing both the leakage of lubricant and the entrance of impurities into the interior of the bearing. As a result of the design of the bearing ring out of elastic material, it is possible to achieve a reduction of noise in the clutch release. Moreover, the elastic holding ring is capable of absorbing shock loads.

The invention is explained below in greater detail with reference to the preferred embodiments illustrated in the drawings.

BRIEF DESCRIPTION OF THE DRAWINGS

FIG. 1 is a cross-sectional view of a clutch release bearing in accordance with the invention, taken along lines I—I of FIG. 2;

FIG. 2 is a plan view of the holding ring embodying the projections in accordance with FIG. 1;

FIG. 2a is a fragmentary sectional view of the holding ring with radical projections;

DETAILED DESCRIPTION OF THE PREFFERRED EMBODIMENTS

Figure 3:
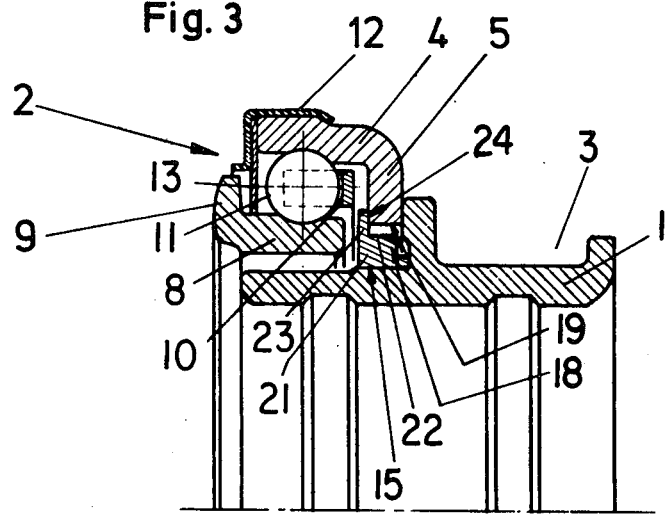
FIG. 3 is a cross-sectional view similar to FIG. 1 of another embodiment, taken along lines III—III of FIG. 4.

The preferred embodiment illustrated in FIG. 1 shows a clutch release bearing and consists essentially of the sliding sleeve 1 which is displaceable axially and is situated concentrically to the drive shaft on a pipe (not shown), and a bearing 2. For the displacement of the sliding sleeve 1 and, thereby, of the bearing 2 in the direction of the clutch (not shown) there are arranged actuating elements (likewise not illustrated) that engage the circular-running groove 3 of the sliding sleeve 1.

The bearing 2 co-operating with the sliding sleeve 1 has a stationary outer race 4 provided with a flange 5 oriented toward the interior of the bearing and designed with two faces 6 and 7. Moreover, the bearing 2 consists of the rotating inner race 8 designed integrally with a radial flange 9 and acting as a thrust washer for the clutch (not shown), and of the rolling elements 11 running between the races and held inside a retainer 10. At the outer race 4 there is arranged a sheet metal cap 12 and a cover disk 13 in such a way as to produce a satisfactory sealing effect between the stationary outer race 4 and the rotating inner race 8.

For the purpose of self-centering of the clutch release, a holding ring 14 is press-fitted onto an axial surfacee 15 of the sliding sleeve 1 in such a way that the face 7 of the flange 5 of the outer race 4 contacts the radial surface 16 of the sliding sleeve 1, and the face 6 contacts the radial leg 17 of the holding ring 14. The radial leg 17 of the holding ring is axially arranged without spring bias and serves mainly for holding together the sliding sleeve 1 and the self-aligning bearing 2. Between the radial flange 5 of the outer race 4 and the holding ring 14, there exists a radial clearance 18 permitting the self-aligning bearing 2 to adjust itself radially with respect to the clutch in the event of a central displacement of the axes.

For the purpose of preventing any circumferential wandering, the bore of the flange 5 of the stationary outer race 4, oriented toward the interior of the bearing, is provided with recesses 19 engaged by the projections 20 of the holding ring 14. Alternatively, the projections or other engaging means could extend from the flange. As illustrated in this preferred embodiment, the holding ring 14 is designed of thin-walled sheet metal and provided integrally with projections 20 machined out of the radial flange 17 of the holding ring 14 and bent over to extend axially. As illustrated in FIG. 2a, it is also possible to machine the projections 20' integrally out of the axial flange 17' and of the holding ring 14' and to bend them over to extend radially.

As a result of this arrangement, it is possible to effectively secure the stationary outer race 4 against circumferential twisting, while not limiting the radial setting movements of the self-aligning bearing.

FIG. 2 illustrates and end or plan view of the holding ring 14 shown in FIG. 1. This drawing shows the projections 20 machined in one piece out of the leg or flange 17, and bent. It is of course understood that the arrangement of the projections 20 distributed over the circumference is not limited to that shown in this embodiment, rather, it is possible to provide over the circumference also a greater or lesser number of projections 20.

Figure 4:
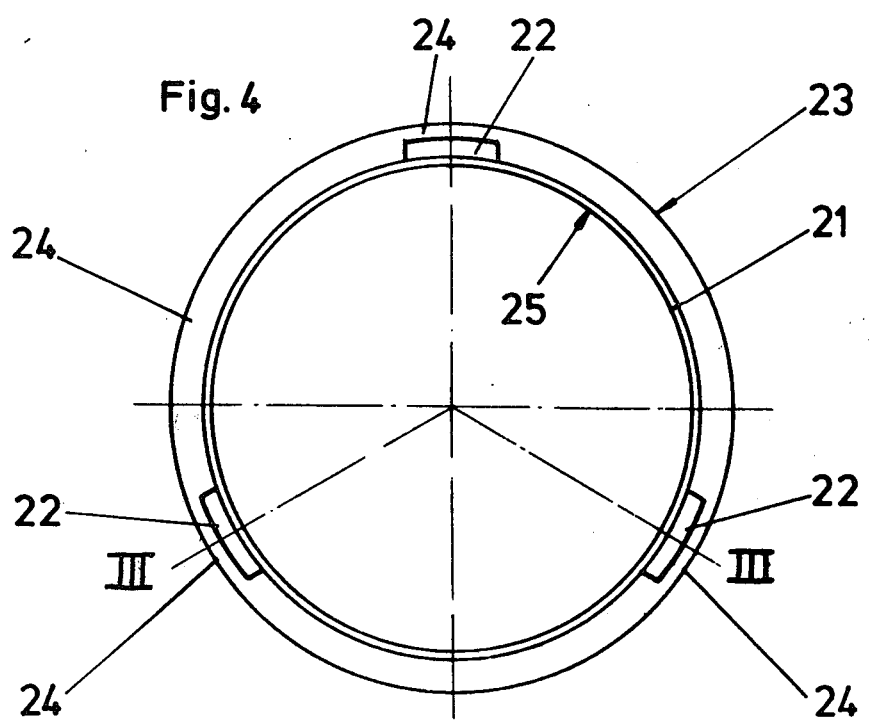
FIG. 4 is a plan view of the elastic holding ring embodying projections in accordance with FIG. 3.

FIG. 3 illustrates another embodiment of the clutch release in accordance with the invention, in which the illustrated holding ring 21 is designed as an elastic component. In this case, the holding ring 21 is preferably manufactured of elastic material, e.g., plastic, with the projections 22 being arranged radially at the axially oriented leg. The radial leg 23 constitutes an uninterrupted face 24 for self-centering of the self-aligning bearing 2. Said holding ring is shown in greater detail in FIG. 4. The bore 25 of the elastic holding ring 21 can, for the purpose of an improved fit on the axial surface 15 of the sliding sleeve 1, be provided with a knurled surface or the like.

Figure 5:
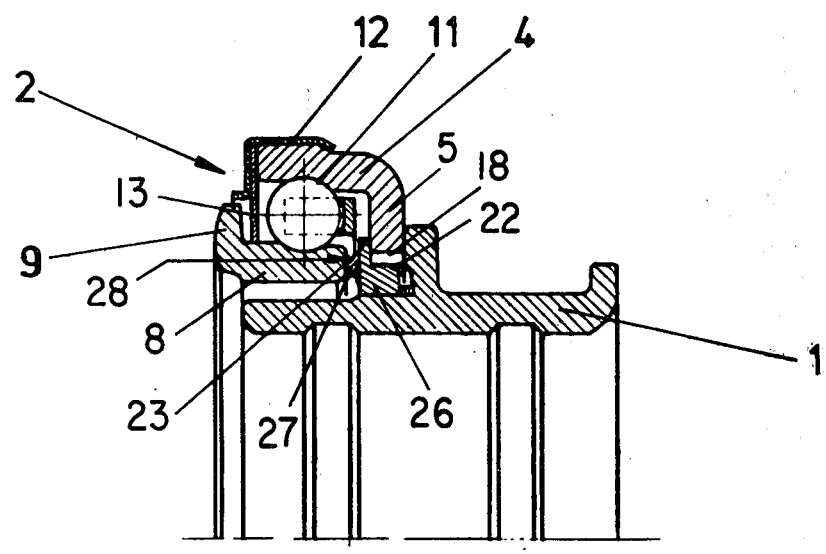
FIG. 5 is a cross-sectional view of another embodiment.

FIG. 5 illustrates another embodiment of the clutch release bearing. The mode of operation of the clutch release bearing is achieved in that, there is provided a sealing lip 27 integrally connected with the elastic holding ring 26 that contacts in axially sealing arrangement the face 28 of the rotating inner race 8. As a result of this arrangement, the inner chamber of the self-aligning bearing 2 is rendered bilaterally tight with satisfactory sealing effect, thereby effectively preventing any entrance of impurities into the interior of the bearing. As a result, the invention produces also an improvement in the life of the clutch release bearing.

The invention has been explained in greater detail with reference to three preferred embodiments, however, it is obvious to the person skilled in the art that it is not limited thereto, but rather that it can be changed or modified in many respects without thereby departing from the spirit and purposes of the invention.

What is claimed is:

1. In a clutch release bearing including a sliding sleeve, an outer race encircling said sleeve and provided with a flange oriented toward the axis of the bearing, and a holding ring fixedly mounted on the outer surface of said sliding sleeve, with the outer race being radially displaceable on the sliding sleeve, the improvement in combination therewith wherein said flange includes circumferentially spaced recesses opening toward the axis of the bearing, and said holding ring has projections distributed around and extending from its circumference, which engage said recesses for preventing rotation of the outer race relative to said sleeve.

2. A clutch release bearing according to claim 1, wherein said projections extend generally axially from said holding ring.

3. A clutch release bearing according to claim 2, wherein said holding ring comprises an elastic material, and said projections are integral extensions of said ring.

4. A clutch release bearing according to claim 3, wherein said bearing includes an inner race with a sealing face, and the elastic holding ring has a substantially axially oriented sealing lip for contacting said face and thus sealing the space between said inner race and the sleeve on which said ring is mounted.

5. A clutch release bearing according to claim 2, wherein said holding ring is made of thinwalled material and has a radially extending flange which is machined to define said projections which extend integrally from said flange.

6. A clutch release bearing according to claim 5, wherein said projections machined out of the holding ring are bent to extend axially.

7. A clutch release bearing according to claim 1, wherein said projections extend radially outward.

8. A clutch release bearing according to claim 7, wherein said holding ring has an axial flange which is machined to define said projections which extend integrally from said flange.

9. In a clutch release bearing including a sleeve and outer and inner race rings and captive rolling elements, the improvement in combination therewith wherein said sleeve has a first portion with a first outer diameter and adjacent thereto a flange extending radially outward, said outer race ring has a flange extending radially inward with a bore of second diameter greater than said first diameter and situated radially outward of said first portion with an annular space defined therebetween, and said flanges having radial faces in mutual contact for preventing relative axial movement in a first direction, said bearing further comprising a holding ring axially fixed on said first portion of said sleeve, situated in said annular gap, and having an outer diameter and projections extending from the circumference thereof for engaging said outer race ring flange for preventing relative rotational movement therebetween, said outer race ring bore diameter being greater than said holding ring outer diameter for permitting relative radial movement therebetween.

10. A bearing according to claim 9, wherein said holding ring projections extend radially outward.

11. A bearing according to claim 9 wherein said holding ring projections extend axially.

12. A bearing according to claim 9, wherein said outer ring race flange has a second radial face remote from the face engaging the flange of said sleeve, and wherein said holding ring includes a flange extending radially outward for engaging said second radial face for preventing relative axial movement of said sleeve and outer ring race in a direction opposite said first axial direction.

13. In a clutch release bearing including a sleeve and outer and inner race rings and captive rolling elements, the improvement in combination therewith wherein said sleeve has a first portion with a first outer diameter, said outer race ring has a flange extending radially inward with a bore of second diameter greater than said first diameter and situated radially outward of said first portion with an annular space defined between adjacent surfaces of said bore and said first portion, said bearing further comprising a holding ring axially fixed on said first portion of said sleeve, situated in said annular gap, and also comprising means extending from one of said adjacent surfaces for engaging the other of said surfaces for preventing relative rotational movement therebetween, said outer race ring bore diameter being greater than said holding ring outer diameter for permitting relative radial movement therebetween.

* * * * *